E. L. MEAD.
CLUTCH.
APPLICATION FILED JUNE 14, 1911.

1,044,220.

Patented Nov. 12, 1912.

2 SHEETS—SHEET 1.

Witnesses:
Christ Feinle, Jr.
U. B. Hillyard.

Inventor,
Edward L. Mead.
By Victor J. Evans,
Attorney.

E. L. MEAD.
CLUTCH.
APPLICATION FILED JUNE 14, 1911.

1,044,220.

Patented Nov. 12, 1912.
2 SHEETS—SHEET 2.

Witnesses:
Christ Feinle, Jr.
V. B. Hillyard.

Inventor,
Edward L. Mead.
By Victor J. Evans,
Attorney.

COLUMBIA PLANOGRAPH CO., WASHINGTON, D. C.

UNITED STATES PATENT OFFICE.

EDWARD L. MEAD, OF ST. LOUIS, MISSOURI.

CLUTCH.

1,044,220.  Specification of Letters Patent.  Patented Nov. 12, 1912.

Application filed June 14, 1911. Serial No. 633,073.

*To all whom it may concern:*

Be it known that I, EDWARD L. MEAD, a citizen of the United States, residing in St. Louis and State of Missouri, have invented new and useful Improvements in Clutches, of which the following is a specification.

This invention provides a mechanism whereby machinery may be thrown out of action in an emergency to prevent fatalities.

The present invention has relation to a clutch and novel actuating means therefor which hereinafter will be more particularly set forth, illustrated in the accompanying drawings, and pointed out in the appended claims.

Figure 1:
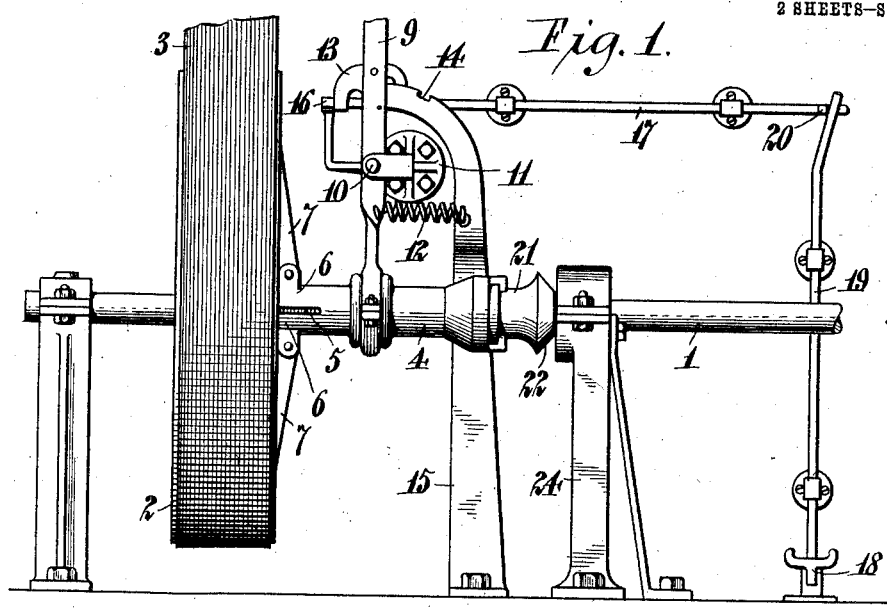
Figure 2:
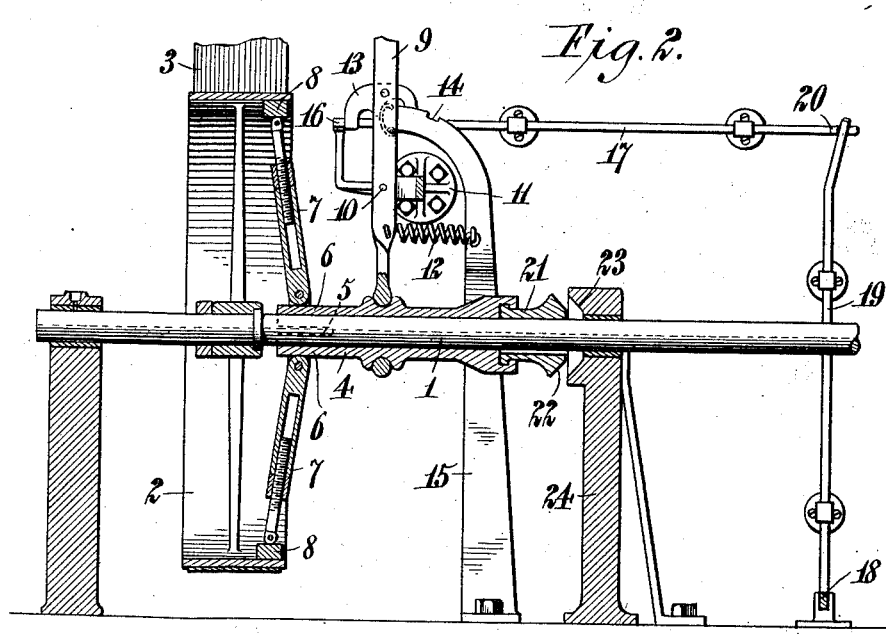
Figure 3:
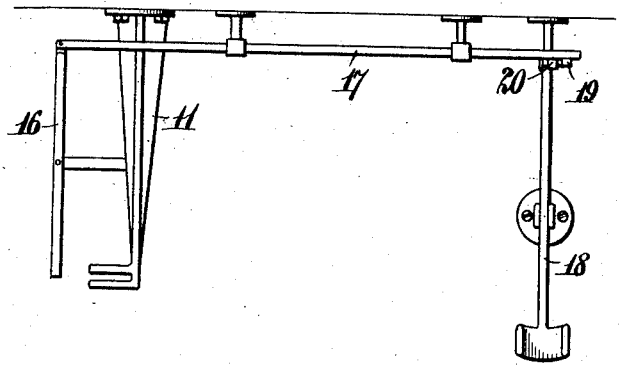
Figure 4:
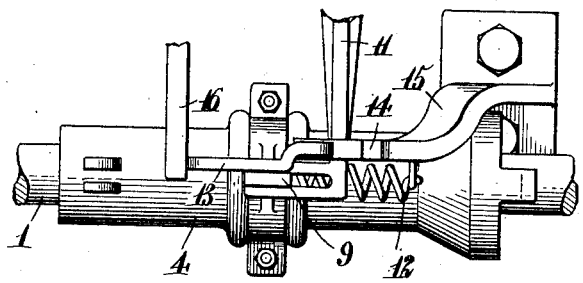

Referring to the drawings, forming a part of the specification, Figure 1 is a view in elevation of a counter-shaft or like part provided with safety mechanism embodying the invention. Fig. 2 is a sectional view. Fig. 3 is a detail view, showing the means for releasing the lever for operating the clutch and brake sleeve. Fig. 4 is a detail plan view.

Corresponding and like parts are referred to in the following description, and indicated in all the views of the drawings, by the same reference characters.

The numeral 1 designates a power driven shaft which may be a counter-shaft or the shaft of a machine or operating part. A pulley 2 is mounted loosely upon the shaft 1 and is adapted to be driven from any suitable source of power by means of a belt 3 or any other well known manner. A sleeve 4 is loose upon the shaft 1 and is adapted to have a free sliding and a rotary movement imparted thereto. Longitudinal slots 5 are formed in the end portion of the sleeve adjacent the pulley 2. The parts 6 separated by the slots 5 are adapted to be compressed so as to grip the shaft 1 and cause the sleeve to rotate therewith. Arms 7 are connected at their inner ends to the spring parts 6 and their outer ends have shoes 8 which are adapted to engage the inner side of the rim of the pulley 2. The arms 7 are preferably constructed so as to be lengthened or shortened to compensate for wear of the shoes 8 and to admit of proper adjustment of the parts to insure a gripping action when it is required to have the shaft, pulley and sleeve rotate together. The arms 7 are pivotally connected at their inner ends to the spring portion 6 of the sleeve 4. The parts are so proportioned that when the spring portions 6 of the sleeve 4 are free from the shaft 1 the arms 7 incline to the plane of the pulley 2 and when the sleeve is moved upon the shaft toward the pulley to cause the parts 6 to grip the shaft 1 the arms 7 occupy a nearly radial position. An operating lever 9 pivoted at 10 to a bracket 11 has engagement with the sleeve 4 to effect a sliding movement thereof on the shaft 1. The sleeve 4 has spaced annular ribs between which an end of the lever 9 fits so as to move the sleeve positively toward or away from the pulley 2. A contractile spring 12 normally holds the lower end of the lever 9 away from the pulley 2 and when the sleeve 4 is moved toward the pulley 2 to cause the latter to rotate with the shaft 1 the spring 12 is subjected to tension. A catch 13 pivoted to the lever 9 is adapted to engage a notch 14 in a bracket 15 to hold the lever 9 when moved to throw the pulley 2 in clutched engagement with the shaft 1. When the catch 13 is tripped the spring 12 reacts and moves the sleeve 4 away from the pulley, thereby releasing the latter so that it may turn freely upon the shaft 1 without imparting any movement thereto. A lever 16 is pivotally supported between its ends and one end of said lever is arranged within the path of the catch 13 to trip the latter. The opposite end of the lever 16 is connected to a bar 17, which is slidably mounted in suitable guides. A foot lever 18 has a bar 19 connected thereto, said bar having an inclined portion to engage a stop 20 or other part of the bar 17 to effect a movement thereof when the foot lever 18 is operated.

A second sleeve 21 is mounted upon the shaft 1 to move thereon, but is keyed thereto for rotation therewith. A brake member 22 is formed at one end of the sleeve 21 and is arranged to coöperate with a brake member 23, which constitutes part of a bearing or bracket 24, said brake member 23 consisting of the wall of a tapered recess formed in a side of the bearing or bracket 24. The brake member 22 is of conical form to match the brake member 23. The sleeve 4 has an interlocking connection with the sleeve 21 to admit of independent rotation of the sleeve but to cause both to move together upon the shaft 1 toward and away from the pulley 2 and the bracket 24. When the sleeve 4 is moved toward the pulley 2 the latter is thrown into clutched engagement with the shaft 1 and the brake member 22 is moved away from the brake member 23, but when the sleeve 4 is moved away from the pulley 2 and toward the bracket or bearing 24 the pulley 2 is released and the brake applied by throwing the member 22 into engagement with the member 23, thereby checking the speed of the shaft 1 by reason of the frictional engagement of the brake members and the rotation of the sleeve 21 with the shaft 1.

When the parts are assembled they occupy the relative position about as indicated in the drawings and when the sleeve 4 is moved to a position intermediate of its extreme movement the pulley 2 rotates freely on the shaft 1 and the brake is released. Upon operating the lever 9 to throw the sleeve 4 toward the pulley 2 the arms 7 are caused to assume a wedging position between the rim of the pulley and the spring members 6 of the sleeve 4, with the result that the shoes 8 are caused to grip the rim of the pulley and the spring portions 6 to grip the shaft 1, thereby throwing the pulley 2 into clutched engagement with the shaft 1 so that both rotate together. The spring 12 is placed under tension and the lever 9 is held in the adjusted position by means of the catch 13. In the event of an emergency requiring the shaft 1 to be quickly thrown out of action and stopped the catch 13 is tripped, which may be effected in a number of ways, as by operation of the foot lever 18, movement of the bar 17 or the tapping of the catch 13 itself. When the catch 13 is tripped the spring 12 comes into play and moves the sleeve 4 so as to release the pulley 2 and at the same time to apply the brake by throwing the brake member 22 into engagement with the brake member 23.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination a power driven shaft, a loose pulley mounted in line with said shaft, a member movable axially of the pulley and shaft, a clutch between said shaft and axially movable member, a second clutch adapted to engage the pulley, and connecting means between the two clutches whereby movement of the said axially movable member causes simultaneous operation of both clutches.

2. In combination a shaft, a loose pulley mounted in line with said shaft, a member movable axially of the pulley and shaft, and connected clutch devices, the one arranged to engage the pulley and the other the shaft, said clutch devices having connection with the axially movable member to be operated thereby.

3. In combination a shaft, a pulley loose upon the shaft, a member slidable upon said shaft, clutch devices connected with the slidable element and movable therewith, shoes adapted to engage the loose pulley, and connecting means between the shoes and clutch devices to effect a gripping of both when the slidable member is moved in one direction and to release both when said slidable member is moved in the opposite direction.

4. In combination a shaft, a pulley mounted in line with the shaft, a sleeve slidable upon the shaft and having portions slotted to form clutch elements, shoes adapted to engage the said pulley, and adjustable connections between said shoes and clutch elements whereby movement of the sleeve in one direction sets the clutch elements and shoes and movement of the sleeve in the opposite direction releases the clutch elements and shoes.

In testimony whereof I affix my signature in presence of witnesses.

EDWARD L. MEAD.

Witnesses:
A. L. SHINKLE,
MAUDE LUPE,
ARTHUR E. KAMMERER.

---

Copies of this patent may be obtained for five cents each, by addressing the "Commissioner of Patents, Washington, D. C."